United States Patent
Morohoshi et al.

(10) Patent No.: US 10,076,748 B2
(45) Date of Patent: Sep. 18, 2018

(54) EXHAUST GAS PURIFICATION CATALYST

(71) Applicant: TOYOTA JIDOSHA KABUSHIKI KAISHA, Toyota-shi, Aichi (JP)

(72) Inventors: Kei Morohoshi, Mishima (JP); Tatsuya Miyazaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 15/031,570

(22) PCT Filed: Oct. 6, 2014

(86) PCT No.: PCT/JP2014/076712
§ 371 (c)(1),
(2) Date: Apr. 22, 2016

(87) PCT Pub. No.: WO2015/079804
PCT Pub. Date: Jun. 4, 2015

(65) Prior Publication Data
US 2016/0263564 A1  Sep. 15, 2016

(30) Foreign Application Priority Data

Nov. 28, 2013 (JP) ................................. 2013-246391

(51) Int. Cl.
| | |
|---|---|
| *B01J 29/06* | (2006.01) |
| *B01J 29/85* | (2006.01) |
| *B01J 37/30* | (2006.01) |
| *B01J 29/70* | (2006.01) |
| *B01J 29/76* | (2006.01) |
| *B01J 35/00* | (2006.01) |
| *F01N 3/10* | (2006.01) |
| *B01D 53/94* | (2006.01) |
| *B01J 23/10* | (2006.01) |
| *B01J 29/72* | (2006.01) |
| *F01N 3/20* | (2006.01) |
| *B01J 35/02* | (2006.01) |
| *B01J 37/02* | (2006.01) |

(52) U.S. Cl.
CPC .......... *B01J 29/85* (2013.01); *B01D 53/9418* (2013.01); *B01J 23/10* (2013.01); *B01J 29/7065* (2013.01); *B01J 29/723* (2013.01); *B01J 29/763* (2013.01); *B01J 35/006* (2013.01); *B01J 37/30* (2013.01); *F01N 3/10* (2013.01); *F01N 3/2066* (2013.01); *B01D 2251/2062* (2013.01); *B01D 2255/2065* (2013.01); *B01D 2255/20738* (2013.01); *B01D 2255/20761* (2013.01); *B01D 2255/50* (2013.01); *B01D 2255/908* (2013.01); *B01J 35/0013* (2013.01); *B01J 35/023* (2013.01); *B01J 37/0211* (2013.01); *B01J 2229/186* (2013.01); *F01N 2370/04* (2013.01); *F01N 2610/02* (2013.01)

(58) Field of Classification Search
CPC ...... B01J 29/85; B01J 29/723; B01J 29/7065; B01J 29/763; B01J 2229/186; B01J 35/023; B01J 35/006; B01J 37/30; B01D 53/9418; B01D 2255/50
USPC ........................................... 502/73, 74, 214
See application file for complete search history.

(56) References Cited

U.S. PATENT DOCUMENTS

| | | | |
|---|---|---|---|
| 5,733,837 A | 3/1998 | Nakatsuji et al. | |
| 5,804,526 A | 9/1998 | Satoh et al. | |
| 2011/0142737 A1 | 6/2011 | Seyler et al. | |
| 2012/0201731 A1* | 8/2012 | Ballinger | B01D 53/9418 423/213.2 |
| 2014/0037523 A1* | 2/2014 | Ballinger | B01D 53/9418 423/212 |

FOREIGN PATENT DOCUMENTS

| | | |
|---|---|---|
| JP | H06-320008 | 11/1994 |
| JP | H07-163871 A | 6/1995 |
| JP | 2011-121055 A | 6/2011 |
| JP | 2013-154261 A | 8/2013 |
| WO | 2012/075400 A1 | 6/2012 |

* cited by examiner

*Primary Examiner* — Elizabeth D Wood
(74) *Attorney, Agent, or Firm* — Oliff PLC

(57) ABSTRACT

Provided is an exhaust gas purification catalyst that purifies nitrogen oxides, comprising a catalyst support and cerium oxide loaded thereon, wherein
the catalyst support contains:
at least one of zeolite selected from the group consisting of chabazite, SAPO-34 and SSZ-13, and
1 wt % to 10 wt % wt % of copper, iron or a mixture thereof based on the weight of the catalyst; and
the amount of the cerium oxide is 1 wt % to 30 wt % based on the weight of the catalyst, and the cerium oxide has a crystallite diameter of 0.1 nm to 2.5 nm.

4 Claims, 3 Drawing Sheets

EXHAUST GAS PURIFICATION CATALYST

TECHNICAL FIELD

The present invention relates to an exhaust gas purification catalyst, and more particularly, to an exhaust gas purification catalyst that catalyzes the reduction of nitrogen oxides.

BACKGROUND ART

When an engine undergoes combustion in an oxygen-rich atmosphere, carbon monoxide, hydrocarbons and nitrogen oxides ($NO_x$) are contained in the exhaust gas. Selective catalytic reduction (SCR) catalysts are known as catalysts that reduce $NO_x$ discharged in an oxygen atmosphere using a reducing agent such as ammonia.

Patent Document 1 describes a catalyst for selective catalytic reduction of nitrogen oxides that is characterized in containing zeolite or a zeolite analog containing 1 wt % to 10 wt % of copper based on the total weight of the zeolite or zeolite analog, and a homogeneous cerium-zirconium mixed oxide and/or cerium oxide, which improves $NO_x$ purification rate at a temperature of 350° C. or higher (Patent Document 1, claim 1, paragraph [0015]).

Patent Document 2 describes a method for producing a catalyst for exhaust gas purification by loading ceria onto a metal oxide other than the ceria, characterized in comprising a step for preparing a mixed solution containing a cerium complex, which contains cerium and a ligand coordinated on the cerium, and an organic solvent for dissolving the cerium complex, and a step for drying the mixed solution and firing the resulting product, wherein the average particle diameter of the ceria is 5 nm or less (Patent Document 2, claim 1, claim 5).

PRIOR ART DOCUMENTS

Patent Documents

Patent Document 1: Japanese Unexamined Patent Publication No. 2011-121055
Patent Document 2: Japanese Unexamined Patent Publication No. 2013-154261

DISCLOSURE OF THE INVENTION

Problems to be Solved by the Invention

However, in the prior art, although exacerbation of $NO_x$ conversion is attempted to be prevented even at a temperature of 350° C. or less by using, for example, 30 wt % to 50 wt % of a cerium-zirconium mixed oxide and/or cerium oxide (Patent Document 1), since the cerium-zirconium mixed oxide does not exhibit the inherent reduction activity of $NO_x$, when a copper-zeolite catalyst responsible for catalytic activity is used in the required amount over a temperature range of 350° C. or lower, catalyst volume becomes large, thereby making this unsuitable for installation in an automobile.

In addition, if the amount of cerium-zirconium mixed oxide is large at 30 wt % to 50 wt %, since the ammonia reducing agent is excessively oxidized at a temperature of 350° C. or higher resulting in the additional formation of $N_2O$ on the cerium-zirconium mixed oxide, the discharged amount of $N_2O$ ends up increasing.

Moreover, since cerium oxide per se does not have the ability to catalyze the purification of $NO_x$, when the loaded amount of cerium oxide is increased, the ratio of inactive cerium oxide increases and catalytic activity per unit weight ends up decreasing.

On the other hand, the invention of Patent Document 2 discloses an oxygen absorbing/desorbing material, and does not disclose an SCR catalyst.

Means for Solving the Problems

As a result of diligent efforts, the inventors of the present invention found that the aforementioned problems can be solved by loading cerium oxide having a specific crystallite diameter onto a specific zeolite support containing copper and/or iron, thereby leading to completion of the present invention.

Modes of the present invention are as indicated below.

(1) An exhaust gas purification catalyst that purifies nitrogen oxides, comprising a catalyst support and cerium oxide loaded thereon, wherein the catalyst support contains:

at least one of zeolite selected from the group consisting of chabazite, SAPO-34 and SSZ-13, and 1 wt % to 10 wt % of copper, iron or a mixture thereof based on the weight of the catalyst; and the amount of the cerium oxide is 1 wt % to 30 wt % based on the weight of the catalyst, and the cerium oxide has a crystallite diameter of 0.1 nm to 2.5 nm.

(2) The exhaust gas purification catalyst according to (1), wherein the cerium oxide is dispersively loaded on the catalyst support.

(3) The exhaust gas purification catalyst according to (1), wherein the amount of the cerium oxide is 1 wt % to 25 wt % based on the weight of the catalyst.

(4) The exhaust gas purification catalyst according to (1), wherein the amount of the cerium oxide is 1 wt % to 10 wt % based on the weight of the catalyst.

Effects of the Invention

The zeolite catalyst loaded with cerium oxide according to the present invention has a superior $NO_x$ purification rate in comparison with zeolite catalysts and catalysts that blend cerium oxide into a zeolite catalyst even at high temperatures, while also being able to effectively control emission of the greenhouse gas, $N_2O$.

BEST MODE FOR CARRYING OUT THE INVENTION

Figure 1:
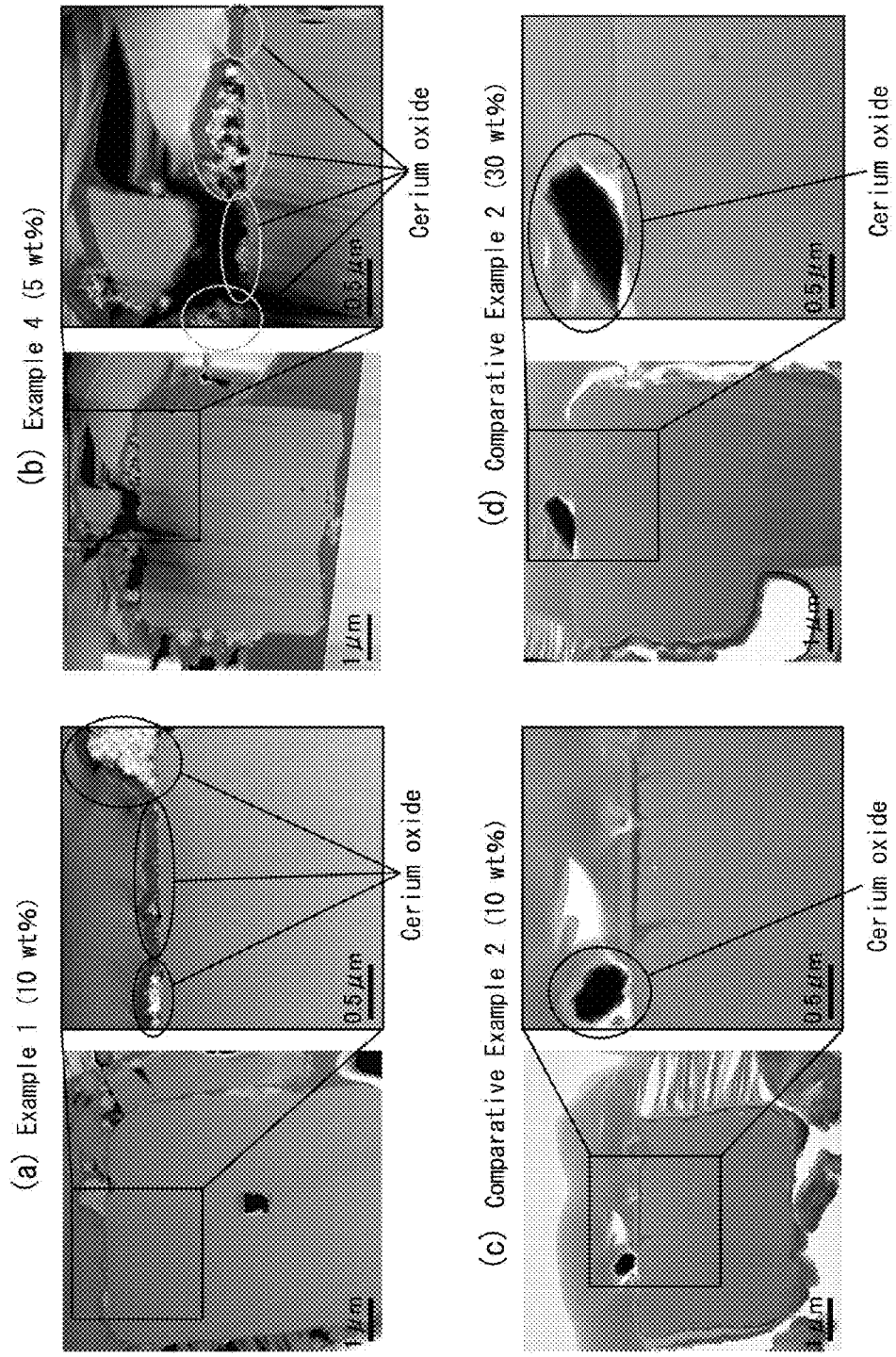
FIG. 1 shows the results of cross-sectional STEM-EDS analyses of catalysts according to Examples 1 and 4 and Comparative Example 2.

In the present description, pore size or pore diameter refers to the diameter of a pore, and in the case a pore is not circular, refers to the equivalent diameter of a circular pore having the same area.

In the present description, particle diameter refers to the diameter of a particle, and in the case a particle is not spherical, refers to the maximum diameter of the particle.

In the present description, "dispersively loaded" refers to loading cerium oxide having an average particle diameter of 0.5 µm or less on a catalyst support in an amount of 30 wt % or less based on the weight of a catalyst comprising a catalyst support, which contains zeolite and copper and/or iron, and cerium oxide on the catalyst support.

The catalyst according to the present invention comprises a catalyst support and cerium oxide ($CeO_2$) on the catalyst support, and the catalyst support contains zeolite and copper and/or iron.

Zeolite having a similar configuration that contains silica and alumina as well as phosphorous and the like as primary constituents thereof, and enables cerium oxide having an average pore diameter of 1.0 nm or less, such as that thought to have a particle diameter of the nanometer order, to be loaded on a catalyst support without incorporating internally, is preferable for use as the zeolite according to the present invention, and chabazite, SAPO-34, SSZ-13 or mixture thereof can be used without any particular limitations since they have these common properties.

Metal in the catalyst support according to the present invention preferably is located in the same area on the periodic table, has similar properties, does not act directly on metal cerium oxide, does not remain on the surface in the form of an oxide, and is loaded in the zeolite at the sub-nanometer level as a result of ion exchange, and copper (Cu), iron (Fe) or mixtures thereof can be used without any particular limitations since they have these common properties.

In the catalyst support according to the present invention, copper and/or iron can be contained at about 0.10 wt % or more, about 0.50 wt % or more, about 0.60 wt % or more, about 0.70 wt % or more, about 80 wt % or more, about 90 wt % or more, about 1.0 wt % or more, about 1.1 wt % or more, about 1.2 wt % or more, about 1.3 wt % or more, about 1.4 wt % or more, about 1.5 wt % or more, about 2.0 wt % or more, about 2.5 wt % or more, about 3.0 wt % or more, about 3.5 wt % or more, about 4.0 wt % or more, about 20 wt % or less, about 18 wt % or less, about 15 wt % or less, about 14 wt % or less, about 13 wt % or less, about 12 wt % or less, about 11 wt % or less, about 10 wt % or less, about 9.5 wt % or less, about 9.0 wt % or less, about 8.5 wt % or less, about 8.0 wt % or less, about 7.5 wt % or less or about 7.0 wt % or less based on the weight of the catalyst.

The cerium oxide ($CeO_2$) according to the present invention can be loaded on the catalyst support in an amount of about 0.1 wt % or more, about 0.5 wt % or more, about 0.60 wt % or more, about 0.70 wt % or more, about 0.80 wt % or more, about 0.90 wt % or more, about 1.0 wt % or more, about 1.5 wt % or more, about 2.0 wt % or more, about 2.5 wt % or more, about 3.0 wt% or more, about 3.5 wt % or more, about 4.0 wt % or more, about 4.5 wt % or more, about 5.0 wt % or more, about 50 wt % or less, about 45 wt % or less, about 40 wt % or less, about 35 wt % or less, about 34 wt % or less, about 33 wt % or less, about 32 wt % or less, about 31 wt % or less, about 30 wt % or less, about 29 wt % or less, about 28 wt % or less, about 27 wt % or less, about 26 wt % or less, about 25 wt % or less, about 22 wt % or less, about 20 wt % or less, about 18 wt % or less, about 15 wt % or less, about 12 wt % or less, about 10 wt % or less, about 9.0 wt % or less, about 8.0 wt % or less or about 7.0 wt % or less based on the weight of the catalyst.

The cerium oxide according to the present invention can have a crystallite diameter of about 0.05 nm or more, about 0.10 nm or more, about 0.20 nm or more, about 0.30 nm or more, about 0.40 nm or more, about 0.50 nm or more, about 0.60 nm or more, about 0.70 nm or more, about 0.80 nm or more, about 0.90 nm or more, about 1.0 nm or more, about 1.1 nm or more, about 1.2 nm or more, about 10.0 nm or less, about 9.0 nm or less, about 8.0 nm or less, about 7.0 nm or less, about 6.0 nm or less, about 5.0 nm or less, about 4.0 nm or less, about 3.2 nm or less, about 3.0 nm or less, about 2.9 nm or less, about 2.8 nm or less, about 2.7 nm or less, about 2.6 nm or less, about 2.5 nm or less, about 2.4 nm or less, about 2.3 nm or less, about 2.2 nm or less, about 2.1 nm or less, about 2.0 nm or less, about 1.9 nm or less, about 1.8 nm or less, about 1.7 nm or less, about 1.6 nm or less or about 1.5 nm or less.

In the catalyst according to the present invention, the crystallite diameter of the cerium oxide remains fine (FIG. 2, Examples 1 to 4), and is dispersively loaded on the catalyst support (FIG. 1(a), FIG. 1(b)).

As a result, in the catalyst according to the present invention, in the case the loaded amount of cerium oxide is about 1 wt % to about 25 wt %, $NO_x$ purification rate exceeded about 44 % and $N_2O$ formation rate was about 1.3% or less, thereby demonstrating an outstandingly high $NO_x$ purification rate and low $N_2O$ formation rate as indicated in Examples 1 to 4 to be subsequently described and the graphs of FIGS. 3 and 4.

In contrast, as indicated in Comparative Examples 1 and 2 to be subsequently described and the graphs of FIGS. 3 and 4, even if zeolite contained copper, if the zeolite did not contain cerium oxide or the cerium oxide and zeolite were merely blended, $NO_x$ purification rate was about 44% or less and $N_2O$ formation rate exceeded about 1.3%, thereby demonstrating a low $NO_x$ purification rate and high $N_2O$ formation rate.

Figure 2:
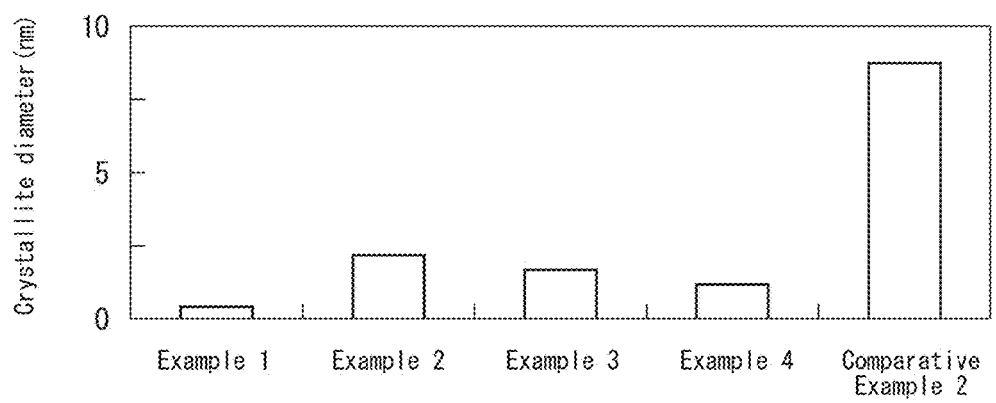
FIG. 2 is a graph representing the crystallite diameter (nm) of cerium oxide (contained at 5 wt % based on the weight of the catalyst) according to Examples 1 to 4 and Comparative Example 2.

In Comparative Example 2 to be subsequently described, since the cerium oxide is merely blended with the zeolite, even if the loaded amount of cerium oxide were to be increased, the particle diameter of the cerium oxide following firing ends up increasing on the catalyst support (FIG. 2, Comparative Example 2) without being dispersively loaded (FIG. 1(c), FIG. 1(d), and in the same manner as the case of the prior art, this is thought to result in an increase in the ratio of inactive cerium oxide to the same degree as the results of Comparative Example 1, which was not loaded with cerium oxide.

Although desirably not bound by any particular theory, the reason the catalyst according to the present invention is able to demonstrate superior high $NO_x$ purification rate and low $N_2O$ formation rate in this manner can be considered to be the result of being able to adequately utilize the unique characteristics of zeolite and cerium oxide by having a prescribed amount of cerium oxide having a small crystallite diameter present on the catalyst support, the unique characteristics of zeolite and cerium oxide comprising:

(1) cerium oxide has the ability to absorb and desorb oxygen, and has the effect of accelerating the reaction between $NO_x$ and a reducing agent as a result of increasing the reaction rate by reducing NO, for example, present among $NO_x$ after oxidizing to $NO_2$;

(2) cerium oxide easily adsorbs acidic gas in the form of $NO_R$ since it has basic properties; and, (3) although cerium oxide has the ability to reduce at high temperatures, since cerium oxide per se does not reduce $NO_x$, zeolites catalyzes the reduction of $NO_2$ and the like to $N_2$ by selective catalytic reduction and the like using ammonia or a reducing agent capable of decomposing ammonia.

Although desirably not bound by any particular theory, when a prescribed amount of cerium oxide having a small crystallite diameter is loaded on a catalyst support as indicated below, the cerium oxide is thought to be dispersively loaded on the catalyst support as a result thereof.

As has been described above, as a result of having a prescribed amount of cerium oxide having a small crystallite diameter present on a catalyst support in this manner, the exhaust gas catalyst according to the present invention can be considered to be able to, in comparison with conventional catalysts blended with cerium oxide, demonstrate superior $NO_x$ purification performance even at a high temperature of 600° C., as well as demonstrate favorable catalyst performance having an outstandingly low $N_2O$ formation rate even at a high temperature of 450° C. (Examples 1 to 4).

EXAMPLES

Although the following provides a more detailed explanation of the present invention through examples thereof, the present invention is not limited by these examples.

Example 1

Step 1-1: A mixture of 100 ml of an aqueous solution obtained by dissolving 0.637 g of ammonium cerium nitrate in ion exchange water (hereinafter, "Aqueous Solution 1") and 500 ml of an aqueous solution containing 28 wt % of aqueous ammonia in ion exchange water (hereinafter, "Aqueous Solution 2") was passed through a thin film-shaped microchannel having a thickness of 30 μm or less at the rate of 100 ml/min for Aqueous Solution 1 and 500 ml/min for Aqueous Solution 2 while applying shear force to precipitate cerium metal and obtain an aqueous solution containing fine cerium metal.

Step 1-2: 9.8 g of SAPO-34 zeolite containing 2.5 wt % of ion-exchanged copper (hereinafter, "Zeolite 1") were added to this aqueous solution and stirred. Moisture was removed by heating while stirring to obtain copper-zeolite loaded with cerium.

Step 1-3: This was dried at 120° C. followed by crushing the solid fraction in a mortar.

Step 1-4: Next, this was fired for 2 hours at 500° C. in the presence of oxygen followed by crushing after subjecting to powder compression molding at 1 ton to obtain pellets measuring 1.0 mm to 1.7 mm.

A sample loaded with 2 wt % of cerium oxide was obtained from the above-mentioned Steps 1-1 to 1-4.

Step 1-5: Catalysts loaded with 5 wt %, 10 wt %, 20 wt % and 30 wt %, respectively, of cerium oxide were synthesized in the same manner.

Example 2

Step 2-1: Zeolite 1 was placed in Aqueous Solution 1 and stirred.

Step 2-2: In order to load cerium metal, dissolved at the ion level in an acidic aqueous solution, on copper-zeolite, which undergoes structural disorder in an acidic aqueous solution, cerium metal was loaded on the catalyst support after rapidly removing moisture by heating to 100° C. or higher simultaneous to Step 2-1. Step 1-3 and Step 1-4 were subsequently performed to synthesize a sample loaded with 2 wt % of cerium oxide.

Step 1-5 was performed in the same manner.

Example 3

Step 3-1: In order to inhibit structural disorder of copper-zeolite by adjusting pH together with causing cerium metal to finely precipitate by applying shear force, Aqueous Solution 2 was added to Aqueous Solution 1 while stirring, and cerium metal was precipitated after adjusting the pH to 7 to 8.

A sample was subsequently synthesized by performing the aforementioned Step 1-2 to Step 1-4.

Step 1-5 was performed in the same manner.

Example 4

Step 4-1: In order to obtain fine cerium by minimizing changes in pH during cerium precipitation, Aqueous Solution 1 was added to Aqueous Solution 2 followed by precipitating cerium metal while adjusting the pH to 7 to 8.

A sample supporting 2 wt % of cerium oxide was subsequently synthesized by performing the aforementioned Step 1-2 to Step 1-4.

Step 1-5 was performed in the same manner. cl Comparative Example 1

Step 1-4 was performed on Zeolite 1 to obtain pellets which are only of the catalyst support.

Synthesis of Cerium Oxide for Use in Comparative Examples

An aqueous solution containing fine cerium metal was obtained from Step 1-1. This aqueous solution was centrifuged for 10 minutes at 3000 rpm to obtain a precipitate, and the aforementioned Steps 1-3 and 1-4 were performed on this precipitate to obtain cerium oxide powder.

Comparative Example 2

Cerium oxide obtained in the "Synthesis of Cerium Oxide for Use in Comparative Examples" was blended into the catalyst support obtained in the aforementioned Comparative Example 1 at 2 wt %, 5 wt %, 10 wt %, 20 wt % and 30 wt %, respectively, followed by performing Step 1-4 to synthesize catalysts containing copper-zeolite and cerium oxide.

Observation of Loaded State of Cerium Oxide

Cross-sectional STEM-EDS analyses (manufacturer: JEOL Ltd., Model No. JEM-2100F transmission scanning electron microscope, accelerating voltage: 200 kV, magnification factors respectively indicated in FIGS. 1(a) to 1(d) are 20 K for the left-hand images and 50 K for the right-hand images) were performed on copper-zeolite particles loaded with cerium oxide of Example 1 (10 wt %), Example 4 (5 wt %) and Comparative Example 2 (10 wt % and 30 wt %) (values in parentheses shown after the examples and comparative example represent the loaded amounts of cerium oxide based on catalyst weight), followed by observing the loaded state and particle diameter of the cerium oxide (FIG. 1).

In Example 1 (10 wt %) and Example 4 (5 wt %), a layer of cerium oxide was observed to cover a portion of the surface of the copper-zeolite particles, and the cerium oxide was determined to be dispersively loaded on the copper-zeolite (FIGS. 1(a) and 1(b)). On the other hand, in Comparative Example 2 (10 wt %), only particles having a particle diameter of about 1 μm were observed as cerium oxide on the surface of the copper-zeolite particles, and the cerium oxide was determined to not be dispersively loaded thereon (FIG. 1(c)). In Comparative Example 2, cerium oxide was not dispersively loaded even if the loaded amount was increased to 30 wt % (FIG. 1(d)).

On the basis of these results, it was determined that, in the prior art, which contains cerium oxide in copper-zeolite, cerium oxide ends up being present on the catalyst support in the form of particles having a large average particle diameter as a result of firing the catalyst.

Calculation of Crystallite Diameter of Cerium Oxide

The crystallite diameter of cerium oxide calculated from XRD diffraction patterns for catalysts of Examples 1 to 4 and Comparative Example 2 containing 5 wt % of cerium oxide are shown in FIG. 2. Crystallite diameter was calculated from the peak at 2θ≈47.5° where the diffraction peak of cerium oxide does not overlap with that of SAPO-34.

The crystallite diameters of cerium oxide in Examples 1 to 4 were 0.3 nm, 2.1 nm, 1.6 nm and 1.1 nm, respectively, while that of Comparative Example 2 was 8.7 nm. As is observed in FIG. 1, the dispersively loaded cerium oxide of Examples 1 to 4 is roughly less than ¼ the size of the cerium oxide of Comparative Example 2 in terms of crystallite diameter.

On the basis of these results, cerium oxide was determined to be dispersively loaded at a prescribed weight percentage and with a small crystallite diameter on the catalyst support.

Evaluation of Nitrogen Oxide ($NO_x$) Purification Rate

Figure 3:
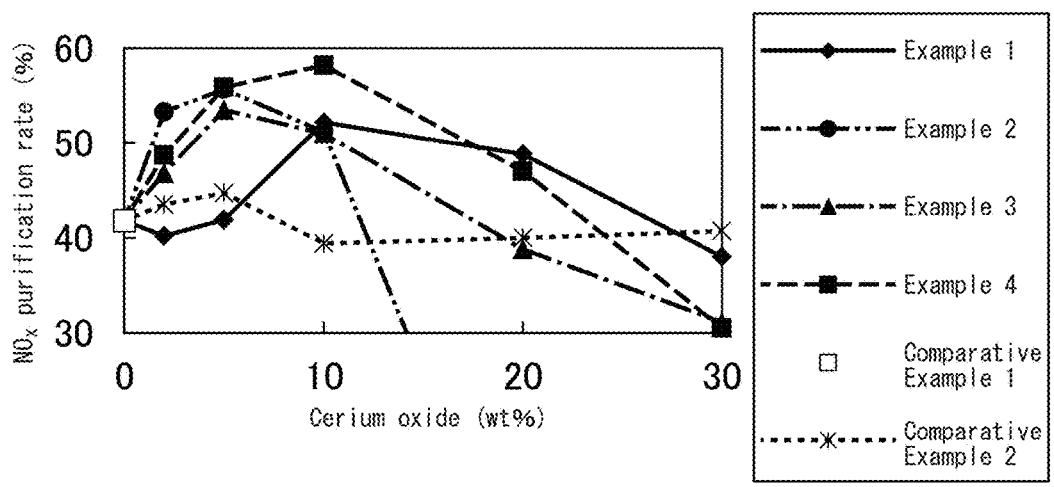
FIG. 3 is graph obtained by plotting $NO_x$ purification rate (%) versus the weight percentage (wt %) of cerium oxide in the catalyst for catalysts according to Examples 1 to 4 and Comparative Examples 1 and 2.

The results of evaluating the $NO_x$ purification rates of intake gas at a temperature of 600° C. using the samples of Examples 1 to 4 and Comparative Examples 1 and 2 are shown in FIG. 3. Nitrogen oxide purification tests were performed using ammonia for the reducing agent in an oxygen-rich atmosphere. The intake gas, in terms of % by volume, comprising 500 ppm of carbon monoxide, 500 ppm of ammonia, 10% oxygen and 5% water with nitrogen added thereto, and was set to a flow rate of 15 L/min (hereinafter, "Intake Gas 1"). 3 g of catalyst pellets were used for evaluation. $NO_x$ formation rate was calculated as the volume ratio of $N_2$ flowing out to the amount of $NO_x$ flowing in.

The $NO_x$ purification rates in Examples 1 to 4 were higher than Comparative Example 1, which is of copper-zeolite only, and Comparative Example 2, in which cerium oxide was blended using the same method as that of the prior art, and particularly high purification rates were demonstrated over the range of an amount of cerium oxide of 1 wt % to 25 wt %. As a result of dispersively loading the cerium oxide, high purification rates were able to be demonstrated even at a high temperature of 600° C. despite only a small amount of cerium oxide. On the other hand, purification rates were observed to decrease as the amount of cerium oxide increased further. This decrease in purification rate is thought to be due to an increase in the ratio of cerium oxide not exhibiting $NO_x$ reduction activity, and that cerium oxide covering the surface of the copper-zeolite.

Evaluation of Nitrous Oxide ($N_2O$) Formation Rate

Figure 4:
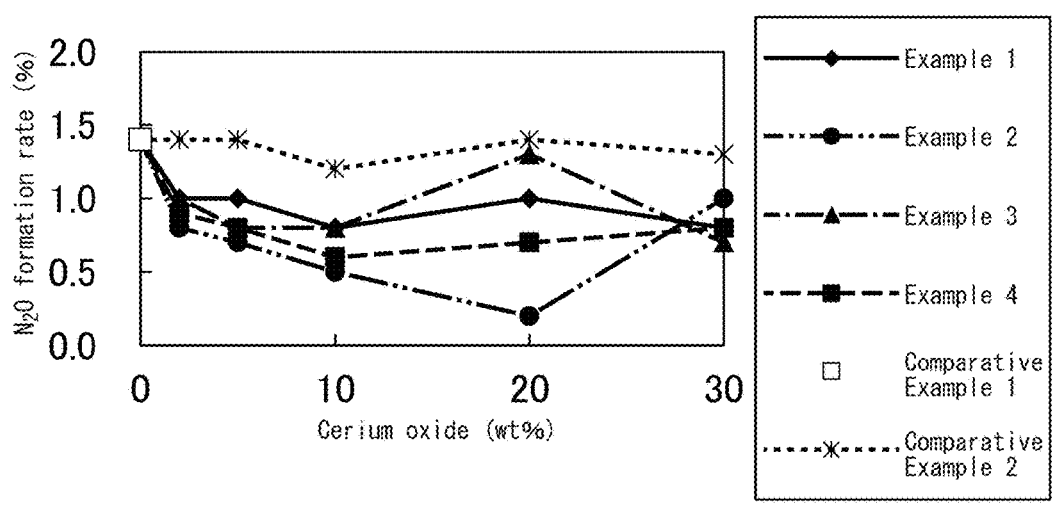
FIG. 4 is a graph obtained by plotting $N_2O$ formation rate (%) versus the weight percentage (wt %) of cerium oxide in the catalyst for catalysts of Examples 1 to 4 and Comparative Examples 1 and 2.

The results of evaluating the $N_2O$ formation rates at an intake gas temperature of 450° C. for Examples 1 to 4 and Comparative Examples 1 and 2 are shown in FIG. 4. The amount of nitrous oxide, which is formed and discharged due to weak reduction when a reduction reaction of nitric oxide has occurred, was investigated using Intake Gas 1. $N_2O$ formation rates were calculated as the volume ratio of nitrous oxide flowing out to the amount of nitric oxide flowing in. 3 g of catalyst pellets were used for evaluation.

In Examples 1 to 4, $N_2O$ formation rates were lower than Comparative Examples 1 and 2, and were considerably lower over the range of an amount of cerium oxide of 1 wt % to 25 wt % in particular (FIG. 4). Normally, as the amount of cerium oxide increases, $N_2O$ is formed and an increase in the $N_2O$ formation rate is observed at high temperatures. However, in Examples 1 to 4, $N_2O$ formation rates were able to be decreased despite only using small amounts of cerium oxide. This decrease in $N_2O$ formation rate is thought to be due to an increase in the amount of $NO_x$ reduced to nitrogen (FIG. 4).

INDUSTRIAL APPLICABILITY

As has been described above, the exhaust gas purification catalyst according to the present invention has favorable performance, demonstrating a high $NO_x$ purification rate and low $N_2O$ formation rate, even at high temperatures. On the basis thereof, the reduction catalyst according to the present invention can be used in various applications in a wide range of fields without being limited to an exhaust gas purification catalyst.

The invention claimed is:

1. An exhaust gas purification catalyst that purifies nitrogen oxides, comprising: a catalyst support and cerium oxide loaded thereon, wherein
   the catalyst support contains:
      at least one of zeolite selected from the group consisting of chabazite, SAPO-34 and SSZ-13, and
      1 wt % to 10 wt % of copper, iron or a mixture thereof based on the weight of the catalyst; and
   the amount of the cerium oxide is 1 wt % to 30 wt % based on the weight of the catalyst, and the cerium oxide has a crystallite diameter of 0.1 nm to 2.5 nm.

2. The exhaust gas purification catalyst according to claim 1, wherein the cerium oxide is dispersively loaded on the catalyst support.

3. The exhaust gas purification catalyst according to claim 1, wherein the amount of the cerium oxide is 1 wt % to 25 wt % based on the weight of the catalyst.

4. The exhaust gas purification catalyst according to claim 1, wherein the amount of the cerium oxide is 1 wt % to 10 wt % based on the weight of the catalyst.

* * * * *